(12) United States Patent
Lan

(10) Patent No.: US 7,533,770 B2
(45) Date of Patent: May 19, 2009

(54) DATA DISC STORAGE ARRANGEMENT

(76) Inventor: Hung-Yu Lan, 1200 Encino Dr., San Marino, CA (US) 91108

( * ) Notice: Subject to any disclaimer, the term of this patent is extended or adjusted under 35 U.S.C. 154(b) by 523 days.

(21) Appl. No.: 11/216,621

(22) Filed: Aug. 30, 2005

(65) Prior Publication Data

US 2007/0045142 A1  Mar. 1, 2007

(51) Int. Cl.
*B65D 85/57* (2006.01)
(52) U.S. Cl. .................. 206/308.1; 206/303; 211/40
(58) Field of Classification Search ............. 206/303, 206/307.1, 308.1, 564; 211/40, 41.12
See application file for complete search history.

(56) References Cited

U.S. PATENT DOCUMENTS

| | | | | |
|---|---|---|---|---|
| 3,306,462 A | * | 2/1967 | Da Cruz | 206/564 |
| 4,588,086 A | * | 5/1986 | Coe | 206/309 |
| 5,632,374 A | * | 5/1997 | Fitzsimmons et al. | 206/308.1 |
| 6,082,553 A | * | 7/2000 | Stravitz | 211/40 |
| 6,571,964 B2 | * | 6/2003 | Jacobson et al. | 211/41.12 |
| 6,685,034 B1 | * | 2/2004 | Cooke | 211/40 |

* cited by examiner

*Primary Examiner*—Luan K Bui
(74) *Attorney, Agent, or Firm*—Raymond Y. Chan; David and Raymond Patent Firm

(57) ABSTRACT

A data disc storage arrangement for a plurality of data discs includes a disc housing having a storage portion, and a disc guider. The disc guider includes a plurality of edge holders spacedly formed on the storage portion of the disc housing, wherein each of the edge holders is adapted for substantially holding a non-data edge of the data disc, such that the disc guider is adapted for spacedly retaining the data discs on the storage portion of the disc housing in an upright manner that data surfaces of the data discs contact with air for preventing the data surfaces of the data discs from being scratched.

6 Claims, 6 Drawing Sheets

DATA DISC STORAGE ARRANGEMENT

BACKGROUND OF THE PRESENT INVENTION

1. Field of Invention

The present invention relates to data discs, and more particularly to a data disc storage arrangement which is capable of securely storing the data discs in a convenient manner while facilitating easy retrieval of the discs.

2. Description of Related Arts

Utilization of data discs, such as Compact Discs (CDs) and Digital Video Discs (DVDs), for storing data in electronic form has become extremely common all over the world. A major advantage of them is that they allow users to avoid storing a huge amount of physical documents. However, a major question of such a data storage strategy is how to maintain or store the discs in a safe condition so as to avoid any accidental damage.

Generally speaking, there exist two major categories of discs storage devices for storing a plurality of data discs. First, a conventional discs rack typically comprises a supporting frame having a receiving cavity defined by a top ceiling, a bottom wall, and two sidewalls of the supporting frame, wherein a plurality of discs sliding guiders are spacedly formed along the sidewalls of the supporting frame for slidably supporting two side edge portions of a disc container containing a disc. There are at least two disadvantages for this kind of disc rack. First, the utilization of this disc rack presupposes that each of the discs is stored in a disc container. This may be true for, say, original CDs for songs or movies, but this is not true for many others which do not come with disc containers. For those data discs, this first kind of disc storage device is simply not applicable.

Another disadvantage is that when the user wants to retrieve a particular data disc from the disc rack, he/she has first to take out the disc container from the disc rack and then open it. This is inconvenient. In fact, some users prefer to throw away the disc containers and only retain the data discs. For these users, the disc rack is obviously not suitable for them.

The second category of data disc storage device is that of conventional data discs storage bags. A conventional data disc storage bag typically comprises a fabric-made or plastic made outer cover, and a plurality of disc storage units bound within the outer cover, wherein each of the disc storage units has two storage pockets formed on two sides thereof respectively for receiving two data discs therewithin. Accordingly, the plurality of data discs are overlappedly stored within the outer cover for forming a compact structure so as to facilitate easy storage as well convenient carrying.

The major problem for this data disc storage bag is that the data discs must be in contact with the disc storage units. Therefore, when the user tries to take out a particular data disc from a particular storage pocket, an inner surface of the disc storage unit defining the storage pocket may scratch on a data surface of the data disc so that the data stored in the data disc may lose due to accidental scratching of the data surface.

Another problem in relation to this second kind of data disc storage bag is that it is time-consuming for the user to search for the disc which he/she is going to retrieve. For conventional data disc storage bag, all the disc storage units are overlappedly bound so that if the user wants to search for a particular disc, he/she has to flip over every disc storage unit to find out which of them is containing the desired disc.

In short therefore, conventional disc storage devices are unsatisfactory in that they are either inconvenient when use or easy to cause damage to the data discs.

SUMMARY OF THE PRESENT INVENTION

A main object of the present invention is to provide a data disc storage arrangement which is capable of securely storing the data discs in a convenient manner while facilitating easy retrieval of the discs.

Another object of the present invention is to provide a data disc storage arrangement which retains a plurality of data discs at their peripheral non-data edge sections so as to avoid contacting with the data surfaces of the data discs. In other words, the data surfaces of the data discs are kept intact while the data discs are securely stored by the present invention.

Another object of the present invention is to provide a data discs storage arrangement which comprises a disc housing having a storage portion and a disc retrieving portion, wherein the data disc at the storage portion can be conveniently driven at the peripheral edge thereof over a bumping ridge provided between the storage portion and the retrieving portion, so that the data disc can then be slid to retain at the disc retrieving portion of the disc housing for easy retrieval. In other words, the user is able to retrieve the data disc very easily.

Another object of the present invention is to provide a data disc storage arrangement which allows a user to locate a desired disc very rapidly so as to overcome the above-mentioned disadvantage of conventional data disc storage device in this respect.

Accordingly, in order to accomplish the above objects, the present invention provides a data disc storage arrangement for a plurality of data discs, comprising:

a disc housing having a storage portion;

a disc guider comprising a plurality of edge holders spacedly formed on the storage portion of the disc housing, wherein each of the edge holders is adapted for substantially holding a non-data edge sector of the data disc, such that the disc guider is adapted for spacedly retaining the data discs on the storage portion of the disc housing in an upright manner that data surfaces of the data discs contact with air only for preventing the data surfaces of the data discs from being scratched.

These and other objectives, features, and advantages of the present invention will become apparent from the following detailed description, the accompanying drawings, and the appended claims.

DETAILED DESCRIPTION OF THE PREFERRED EMBODIMENTS

Figure 1:
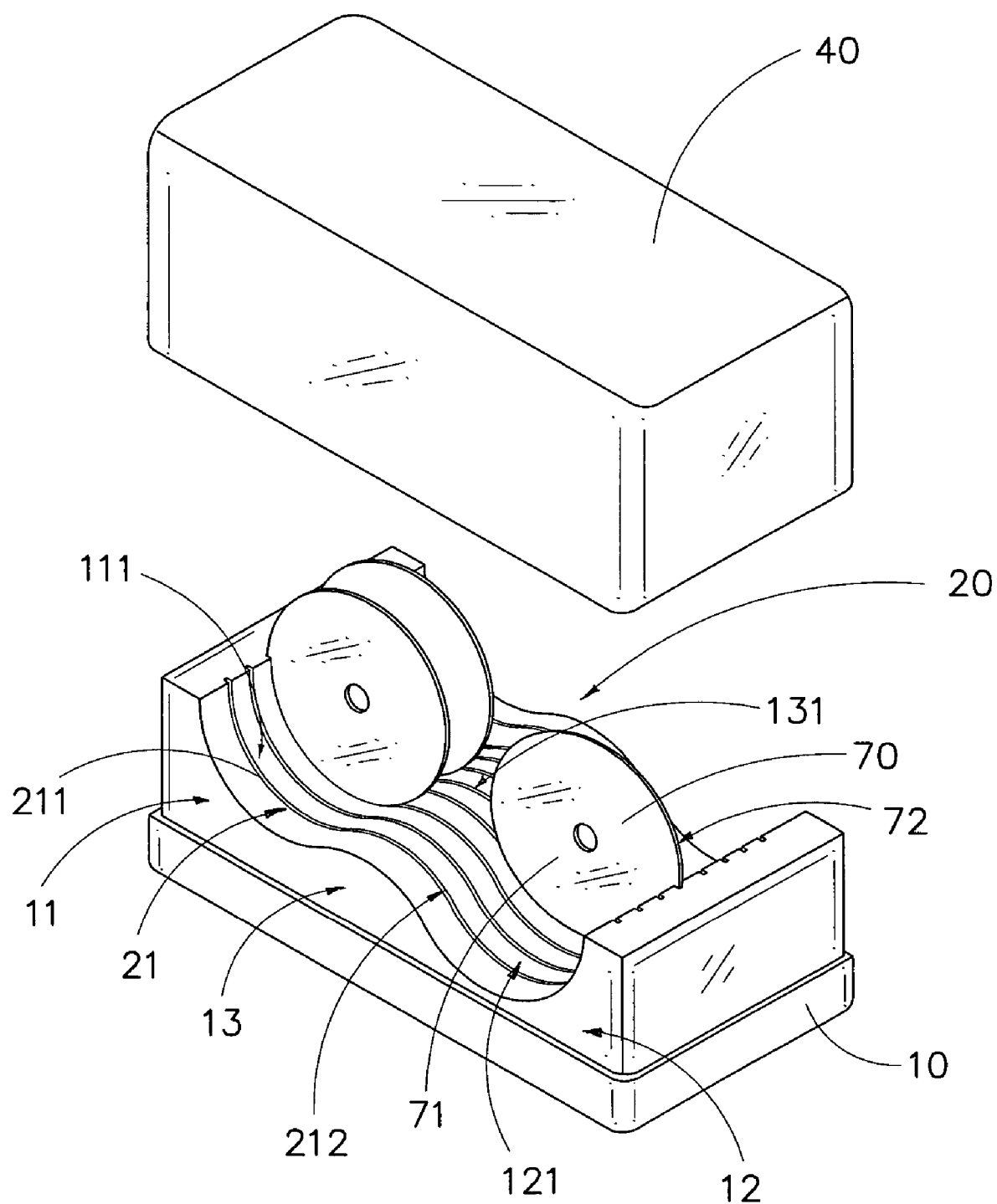
FIG. 1 is a perspective view of a data disc storage arrangement according to a preferred embodiment of the present invention.
Figure 2:
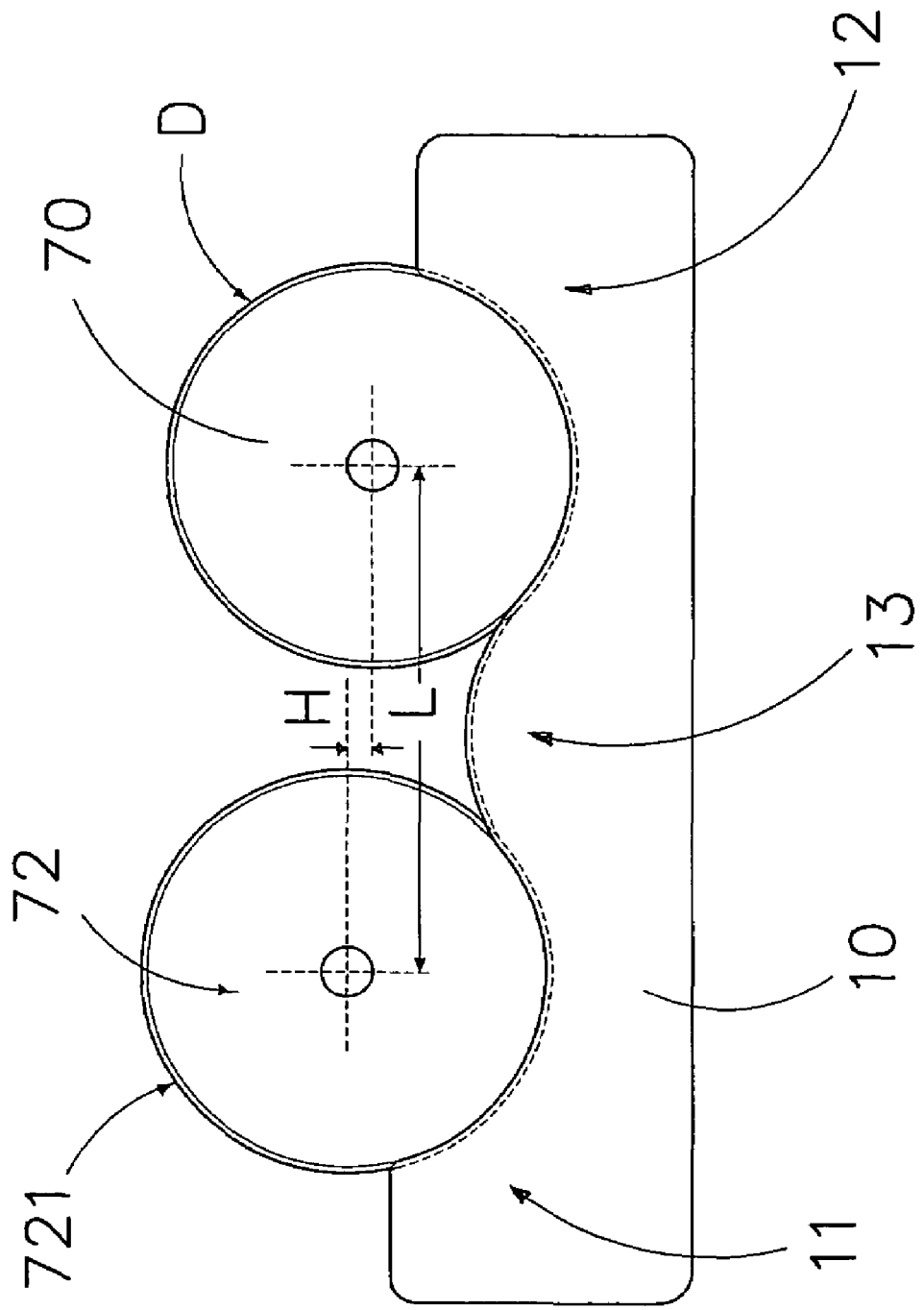
FIG. 2 is a side view of the data disc storage arrangement according to the above preferred embodiment of the present invention.

Referring to FIG. 1 and FIG. 2 of the drawings, a data disc storage arrangement for a plurality of data discs 70 is illustrated, in which the data disc storage arrangement comprises a disc housing 10 and a disc guider 20. The data discs 70, such as typical compact discs (CDs) or Digital Video Discs (DVDs), are expected to be circular in shape having a top marking surface 71 and a bottom data surface 72 defining a peripheral edge sector 721 as the edge of the data surface 72. According to the preferred embodiment of the present invention, the data disc storage arrangement comprises a disc housing 10 having a storage portion 11, and a disc guider 20.

The disc guider 20 comprises a plurality of edge holders 21 spacedly formed on the storage portion 11 of the disc housing 10, wherein each of the edge holders 21 is adapted for substantially holding a non-data edge sector 721 of the data disc 70, such that the disc guider 20 is adapted for spacedly retaining the data discs 70 on the storage portion 11 of the disc housing 10 in an upright manner that the data surfaces 72 of the data discs 70 only contact with air for preventing the data surfaces 72 of the data discs 70 from being scratched or damaged during the course of retrieving and storage of the data discs 70.

According to the preferred embodiment of the present invention, the disc housing 10 further has a disc retrieving portion 12 extending from the storage portion 11, and a bumping ridge 13 which is provided between the storage portion 11 and the disc retrieving portion 12 and is arranged in such a manner that when the data disc 70 at the storage portion 11 is driven at the peripheral edge sector 721 thereof over the bumping ridge 13, the data disc 70 is slid to retain at the disc retrieving portion 12 of the disc housing 10 so that a user is able to retrieve the relevant data disc 70 from the disc retrieving portion 12.

Moreover, each of the edge holders 21 contains an elongated holding slot 211, which is formed on the storage portion 11 of the disc housing 10, has a size for fitting the outer peripheral edge sector as the non-data edge sector 721 of the data disc 70 into the holding slot 211 so as to retain the data disc 70 at the storage portion 11 of the disc housing 10 in an upright manner.

Accordingly, when the data discs 70 slide from the storage portion 11 to the disc retrieving portion 12, the disc housing 10 is only in contact with the outer peripheral edges of the data discs so that other portion of the bottom data surface 72, which is usually loaded with data, is kept intact. In other words, the chance of scratching the data surfaces 72 by the disc housing 10 can be minimized so as to prevent any data loss through scratching of the data discs 70 by the data disc storage arrangement of the present invention.

As shown in FIG. 1 and FIG. 2 of the drawings, the storage portion 11 has a top utility surface 111 having a radius of curvature substantially matches with the contour of the data disc 70, i.e. the circumference D of the data disc 70, wherein the edge holders 21 are spacedly extended along the top utility surface 111 of the storage portion 11 for fittedly retaining the data discs 70 at the storage portion 11. In other words, when any one of the data discs 70 is driven at the outer peripheral edge sector 721, the data disc 70 will slide alone the corresponding elongated holding slot 211 for sliding over the bumping ridge 13 and retaining at the disc retrieving portion 12.

On the other hand, the disc retrieving portion 12 of the disc housing 10 has an upper retrieving surface 121 having a radius of curvature corresponding to the peripheral edge sector 721 of the data disc 70, wherein the bumping ridge 13 has an upward curving surface 131 integrally extended from the storage portion 11 to the upper retrieving surface 121 of the disc retrieving portion 12 to form a wavy guiding surface that the edge holders 21 are spacedly extended along the wavy guiding surface for slidably guiding the data disc 70 to slide from the storage portion 11 of the disc housing 10 to the disc retrieving portion 12 thereof.

In order to effectively keep the data surface 72 of each of the data disc 70 intact, each of the holding slots 211 has a predetermined thickness slightly larger than a thickness of the data disc 70, and a predetermined deepness slightly smaller than a deepness of the outer peripheral edge sector 721, so as to allow the outer peripheral edge sector 721 of the data disc 70 disposing in the respective holding slot 211 at a position that the data surface 72 of each of the data discs 70 is retained in a non-contacting manner. In other words, during the course of sliding of the data disc 70 between the storage portion 11 and the disc retrieving portion 12, the data surface 72 is kept not to contact with physical objects except air.

Figure 3:
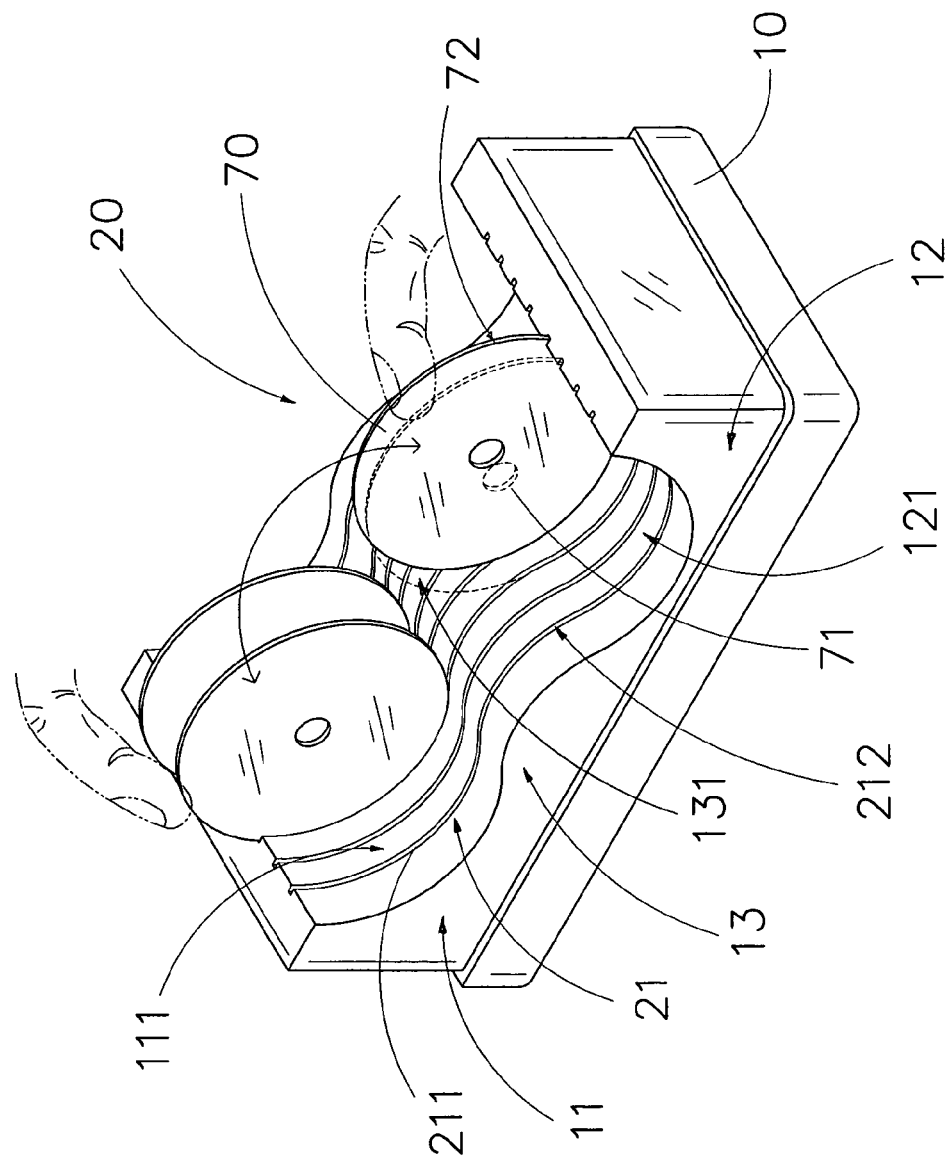
FIG. 3 is a schematic diagram of the data disc storage arrangement according to the above preferred embodiment of the present invention, illustrating that the data disc being retrieved by a slight finger driving.

According to the preferred embodiment of the present invention, the storage portion 11 is provided at a position slightly higher than the disc retrieving portion 12 while the bumping ridge 13 is integrally formed between the storage portion 11 and the disc retrieving portion 12. As a result, when the data disc 70 slides over the bumping ridge 13 from the storage portion 11, it is guided to fall into the disc retrieving portion 12 by natural gravitational force so that the data disc 70 will not in any event slides back to the storage portion 11 unless being externally pushed by the user of the present invention. In other words, the user is able to drive the data disc 70 from the storage portion 11 to the disc retrieving portion 12 over the bumping ridge 13 by a finger contacting at the outer circumference of the data disc 70, as shown in FIG. 3.

Preferably, the storage portion 11 of the disc housing 10 is located at a position higher than the disc retrieving portion 12 thereof for holding each of the data discs 70 at a position that a center of the data disc 70 at the storage portion 11 is higher than that of the data disc 70 at the disc retrieving portion 12 at a predetermined height H, as shown in FIG. 2, so as to guide the data disc 70 to roll over the bumping ridge 13 from the storage portion 11 to the data disc retrieving portion 12. Preferably, a distance L between the center of the data disc 70 at the storage portion 11 and the center of the data disc 70 at the disc retrieving portion 12 is larger than a diameter of the data disc 70.

It is worth mentioning however, that as an obvious alternative, the storage portion 11 and the disc retrieving portion 12 may be formed at the same height, provided that the bumping ridge 13 is upwardly protruded from both portions 11, 12 for creating the above-mentioned gravitational guiding effect to the data disc 70.

Moreover, in order to facilitate effective retrieval of the data disc 70 at the disc retrieving portion 12, the edge holders 21 further contains a plurality of elongated retaining slots 212 spacedly formed on the data retrieving portion 12 and aligned with the elongated holding slots 211 respectively so that when the data discs 70 are driven to slide over the bumping ridge 13, the data discs 70 will slide alone the corresponding elongated retaining slots 212 for being substantially retained at the disc retrieving portion 12 for retrieval by the user of the present invention. In other words, the elongated retaining slots 212 extend from the holding slots 211 respectively at the bumping ridge 13 so as to continuously guide the corresponding data discs 70 to slide from the storage portion 11 to the disc retrieving portion 12 of the disc housing 10 in a smooth and secure manner.

Note that a depth of each of the retaining slots 212 is preferably the same as that of the holding slots 211 for maximizing a stability of the disc sliding from the storage portion 11 to the disc retrieving portion 12, and ensuring that the data surface 72 of the relevant data disc 70 is kept intact.

Referring to FIG. 1 to FIG. 3 of the drawings, the operation of the present invention is as follows: the data discs 70 are initially stored in the storage portion 11 at the corresponding holding slots 211, and are spacedly apart from each other so as to minimize the possibility of inter-scratching between data discs 70. When the user wants to retrieve a particular data disc 70 stored in the storage portion 11, he or she simply needs to slightly drive the relevant data disc 70 to slide over the bumping ridge 13. After that, the data disc 70 will then guide to slide into the disc retrieving portion 12 along the corresponding retaining slots 212. The user is then able to manually retrieve the data disc 70 for further use.

It is worth mentioning that when the data discs 70 are separately stored in the storage portion 11, the user is able to identify each of the data discs 70 so as to directly pick those data discs 70 which he/she wants to retrieve. In other words, the disadvantage of the data disc storage bag as mentioned above is substantially eliminated. Moreover, the data disc storage arrangement may optionally comprise a cover 40 for enclosing the disc housing 10 for further protection and thus preventing the dust entering into the disc housing 10, as shown in FIG. 1 of the drawings.

From the forgoing descriptions, it can be shown that the above objects have been substantially accomplished. The present invention effectively provides a data disc storage arrangement which is capable of securely storing the data discs 70 in a convenient manner while facilitating easy retrieval of the data discs 70. Moreover, the data disc storage arrangement retains the data discs 70 only at their peripheral edges so as to avoid contacting with the data surfaces 721 of the data discs 70 for keeping the data surfaces intact.

It is worth mentioning that a user of the present invention may drive several data discs 70 from the storage portion 11 to the disc retrieving portion 12 at one time so that the user may retrieve the data discs 70 in a desirable order from the disc retrieving portion 12. For example, if the user prefers to listen to three data discs 70 in a particular order, he/she may drive the three desirable data discs 70 from the storage portion 11 to the disc retrieving portion 12 such that the data discs 70 are temporarily supported at the disc retrieving portion 12 of the disc housing 10 that intend to use. Therefore, every time he/she finishes listening one of those data discs 70, he/she can simply take out another data disc 70 from the disc retrieving portion 12 without relocating the next desirable data discs 70 from the storage portion 11 again. In other words, the disc retrieving portion 12 of the disc housing 10 also acts as a temporary storage for several desirable data discs 70 to be selectively used so as to bring the maximum convenience and flexibility for the user to retrieve a plurality of the data discs 70.

Figure 4:
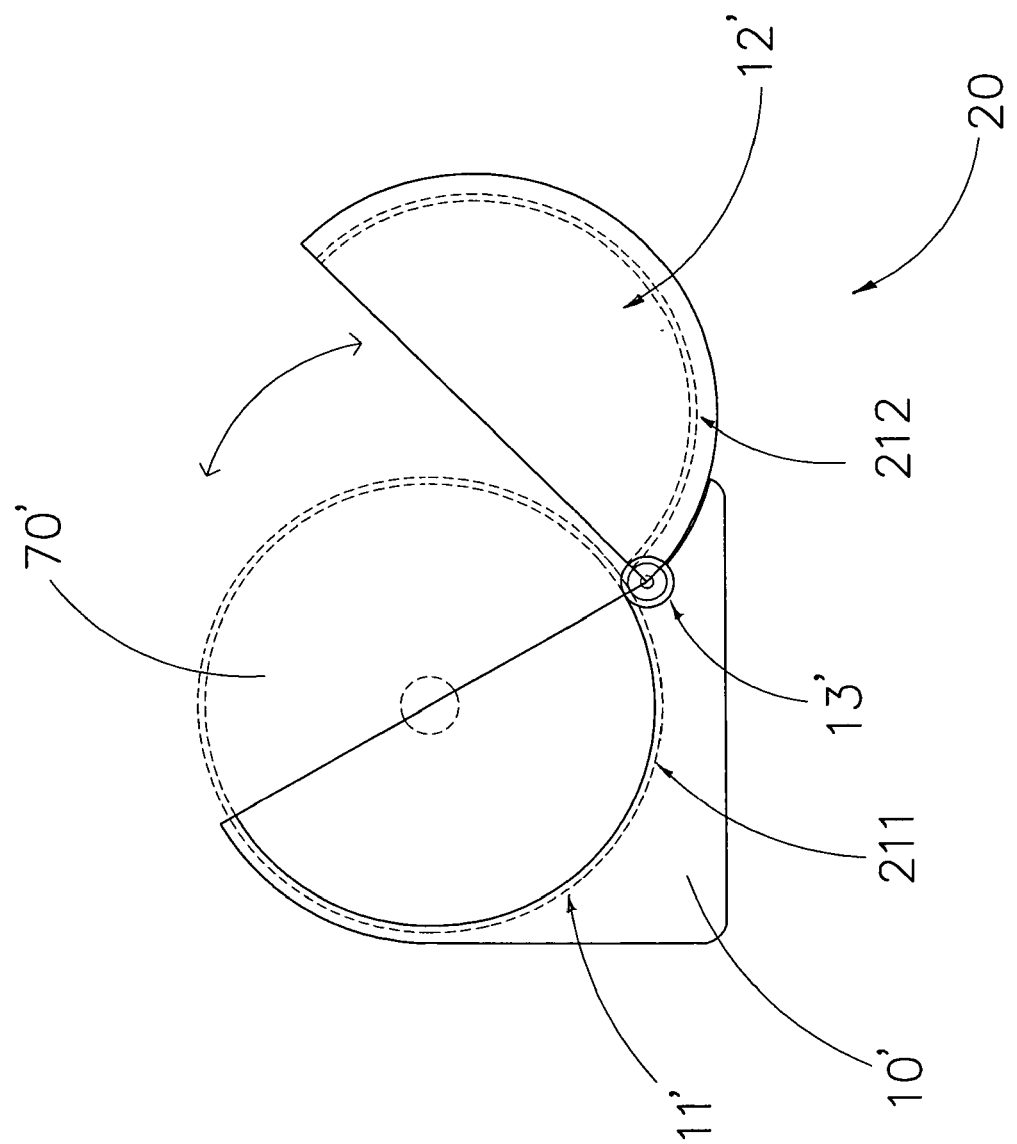
FIG. 4 is a first alternative mode of the data disc storage arrangement according to the above preferred embodiment of the present invention.

Referring to FIG. 4 of the drawings, a first alternative mode of the present invention is illustrated. The first alternative mode is similar to the preferred embodiment except the disc housing 10'. According to the alternative mode, Thus, the disc retrieving portion 12' of the disc housing 10' is pivotally connected with the storage portion 11' at the bumping ridge 13' such that the disc retrieving portion 12' of the disc housing 10' forms an enclosing cover when the disc retrieving portion 12' of the disc housing 10' is pivotally folded to enclose the storage portion 11' thereof and forms a retrieving platform when the retrieving portion 12' of the disc housing 10' is pivotally folded to align with the storage portion thereof.

In other words, the data disc storage arrangement is foldable to form a box shape container to store the data discs 70' therein when the disc retrieving portion 12' of the disc housing 10' is pivotally folded to the storage portion 11' thereof. In addition, when the disc retrieving portion 12' of the disc housing 10' is pivotally folded from the storage portion 11' thereof to form the bumping ridge 13' therebetween, the data discs 70' can be easily to be retrieved from the storage portion 11' of the disc housing 10' to the disc retrieving portion 12' thereof.

Figure 5:
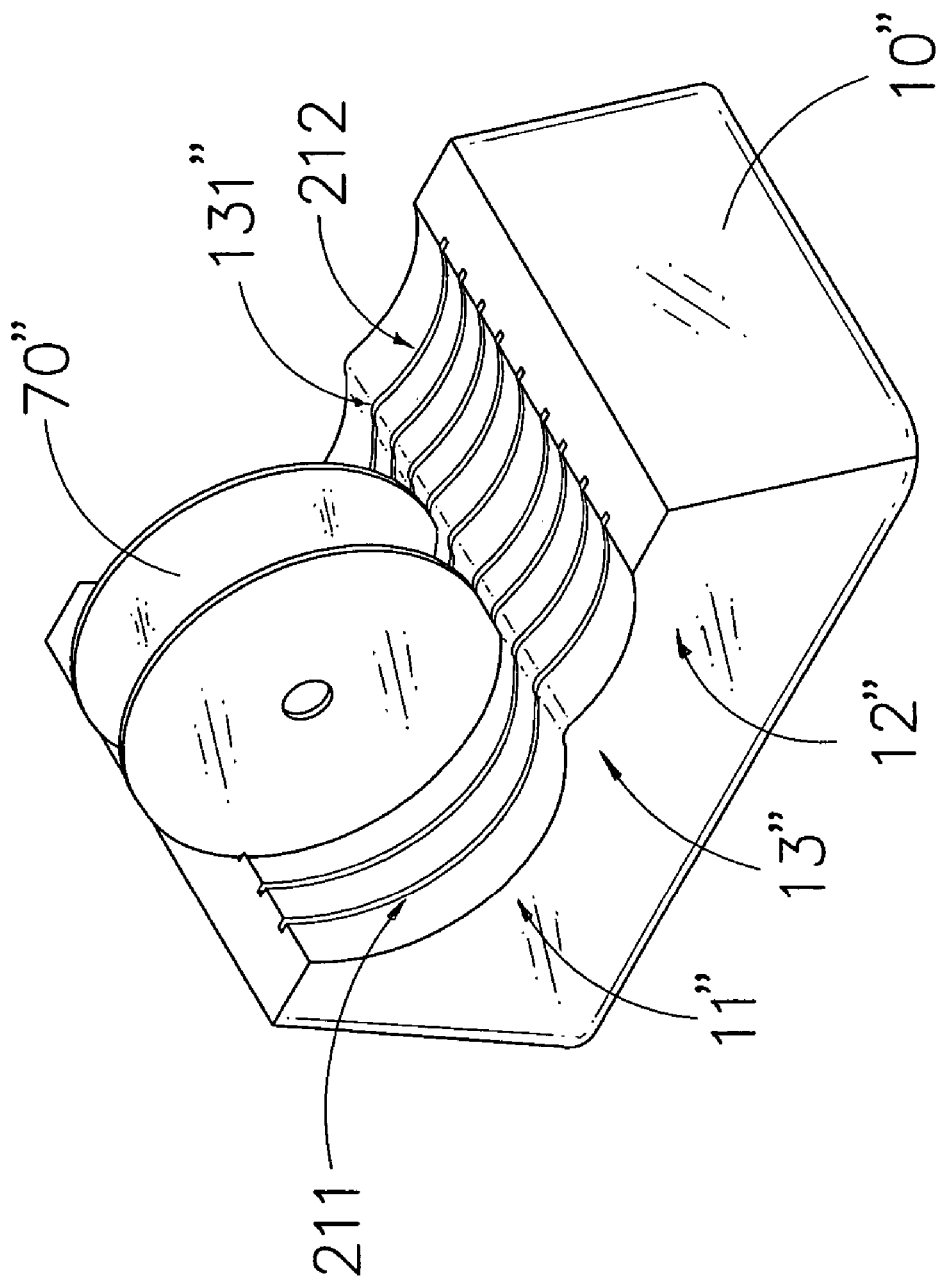
FIG. 5 is a second alternative mode of the data disc storage arrangement according to the above preferred embodiment of the present invention.

Referring to FIG. 5 of the drawings, a second alterative mode of the data disc storage arrangement according to the preferred embodiment of the present invention is illustrated. The second alternative mode is similar to the preferred embodiment, except the disc housing 10". According to the second alternative mode, a length of the data retrieving portion 12" is designed to be substantially smaller than a length of the storage portion 11" so as to minimize a space occupation of the present invention while preserving effective accomplishment of the above-mentioned objects of the present invention. Specifically, when the data discs 70" slide from the storage portion 11" to the data retrieving portion 12", they are retained at the data retrieving portion 12" at the corresponding retaining slot 212" for retrieval by the user.

Moreover, a length of the upward curving surface 131" of the bumping ridge 13" is also made smaller than that of the preferred embodiment so that the overall size of the disc housing 10" can be substantially reduced.

Figure 6:
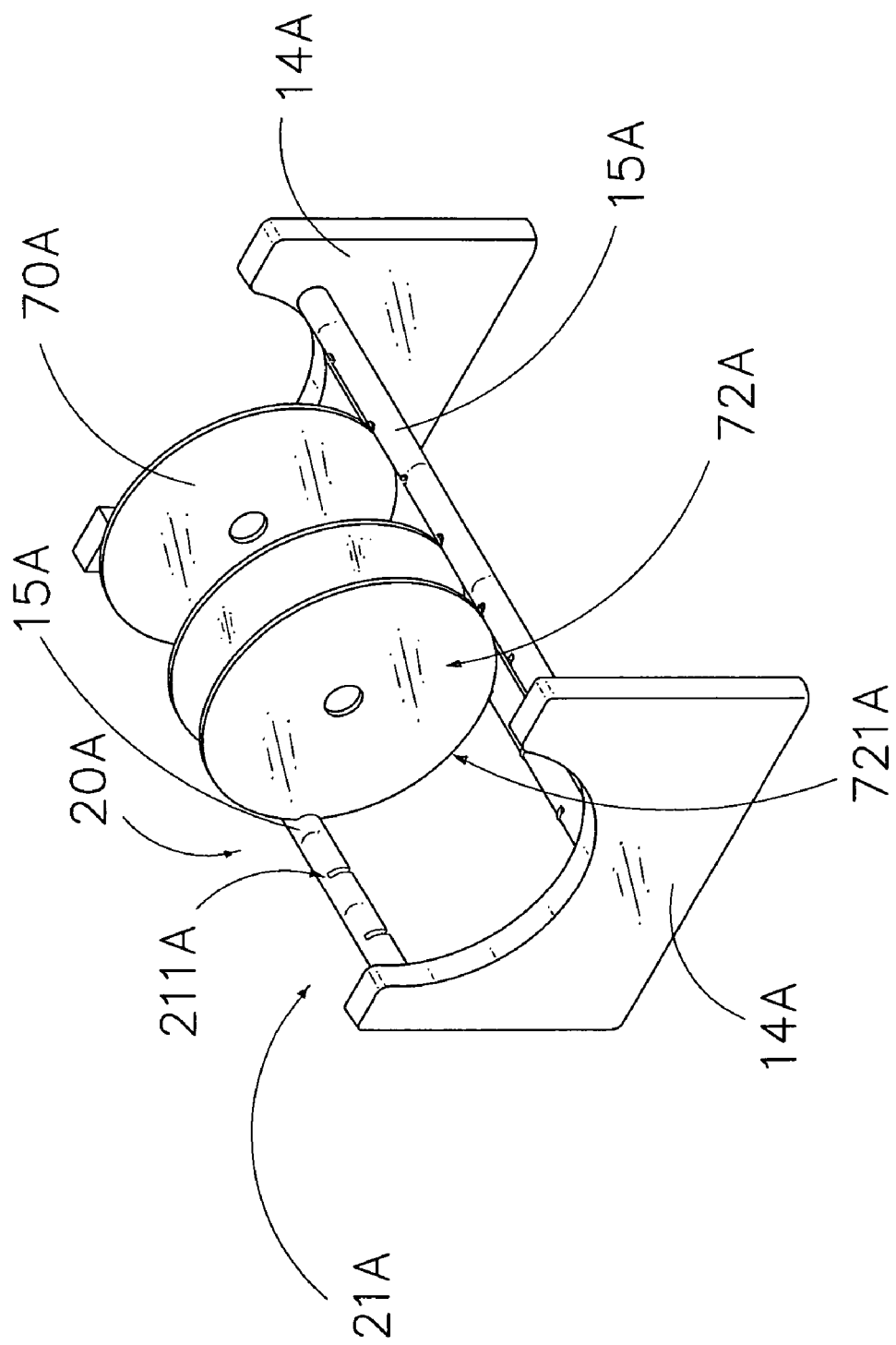
FIG. 6 is a third alternative mode of the data disc storage arrangement according to the above preferred embodiment of the present invention

Referring to FIG. 6 of the drawings, a third alterative mode of the data disc storage arrangement according to the preferred embodiment of the present invention is illustrated. The third alternative mode is similar to the preferred embodiment, except the disc guider 20A. According to the second alternative mode, the holding slots 211A are embodied as holding slits which are spacedly formed on the storage portion 11A, wherein the peripheral edge sector 721A of each of the data discs 70A is fittedly received and substantially retained into the holding slits respectively for secure storage of the data discs 70A.

More specifically, the disc housing 10A comprises two sidewalls 14A and at least two elongated supporting members 15A transversely and spacedly extending between the two sidewalls 14A to form the storage portion 11A therebetween, wherein the edge holders 21A are spacedly formed on the two elongated supporting members 15A for securely holding the non-data edge sectors 721A of the data discs 70A on the elongated supporting members 15A in an upright manner.

In other words, each of the data discs 70A is substantially supported in between the two elongated supporting members 15A while the peripheral edge sector 721A is retained at the corresponding holding slots 211A.

As a result, according to the third alternative mode of the present invention, the data disc storage arrangement is capable of storing the data discs 70A in a secure manner and the user is able to manually and conveniently identify which data disc 70A he/she intends to retrieve and retrieve that data disc 70A accordingly. Since the data discs 70A are spacedly supported in the storage portion 11A, the data surfaces 72A are kept to contact only with air to avoid scratching with other physical objects.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A data disc storage arrangement for a plurality of data discs each having an inner data surface containing data, and an outer non-data edge sector which is not written to store data thereon, comprising:

a disc housing having:

a storage portion having a top utility surface having a radius of curvature adapted for substantially matching with a contour of the outer non-data edge sector of the data disc, a disc retrieving portion extending from said storage portion and having an upper retrieving surface having a radius of curvature adapted for matching the contour of the outer non-data edge sector of the data disc, and a bumping ridge which is provided between said storage portion and said disc retrieving portion and has an upward curving surface integrally extended from said top utility surface of said storage portion to said upper retrieving surface of said disc retrieving portion to form a wavy guiding surface; and a disc guider which comprises a plurality of edge holders formed on said storage portion, said disc retrieving portion and said bumping ridge of said disc housing, wherein said edge holders are elongated holding slots spacedly extending along said wavy guiding surface formed on said storage portion, said bumping ridge and said disc retrieving portion of said disc housing, each of said elongated holding slots being sized and formed to hold the outer non-data edge sector of the data disc in position for spacedly retaining said data discs on said storage portion of said disc housing in an upright manner while preventing the inner data surfaces of the data discs from being contacted with any physical objects; wherein said storage portion is provided at a position higher than said disc retrieving portion while said bumping ridge is integrally formed between said storage portion and said disc retrieving portion, thereby when any of the data discs is able to be drive from said storage portion to said disc retrieving portion by a finger contacting at an outer circumference of the outer non-data edge sector of the data disc to slide over said bumping ridge from said storage portion, said data disc is capable of being guided to roll over said bumping ridge from said storage portion to said disc retrieving portion by means of gravitational force and preventing the data disc from sliding back to the storage portion unless a manual push is applied thereto and preventing any contacting of the inner data surface of the data disc.

2. The data disc storage arrangement, as recited in claim 1, wherein each of said holding slots has a thickness slightly larger than a thickness of the data disc and a deepness slightly smaller than a deepness of the outer non-data edge sector of the data disc so as to allow the outer non-data edge sector of the data disc disposing in said respective holding slot at a position that the inner data surface is retained in a non-contacting manner.

3. The data disc storage arrangement, as recited in claim 1, wherein said storage portion is located at said position higher than said disc retrieving portion for holding the data disc at a position that a center of the data disc at the storage portion is higher than that of the data disc at the disc retrieving portion.

4. The data disc storage arrangement, as recited in claim 2, wherein said storage portion is located at said position higher than said disc retrieving portion for holding the data disc at a position that a center of the data disc at the storage portion is higher than that of the data disc at the disc retrieving portion.

5. The data disc storage arrangement, as recited in claim 3, wherein a distance between the center of the data disc at said storage portion and the center of the data disc at said disc retrieving portion is larger than a diameter of the data disc.

6. The data disc storage arrangement, as recited in claim 4, wherein a distance between the center of the data disc at said storage portion and the center of the data disc at said disc retrieving portion is larger than a diameter of the data disc.

* * * * *